April 3, 1951          E. HANSON          2,547,002
APPARATUS FOR DETERMINING THE LIQUID LEVEL IN A CONTAINER
Filed April 16, 1945          3 Sheets-Sheet 1
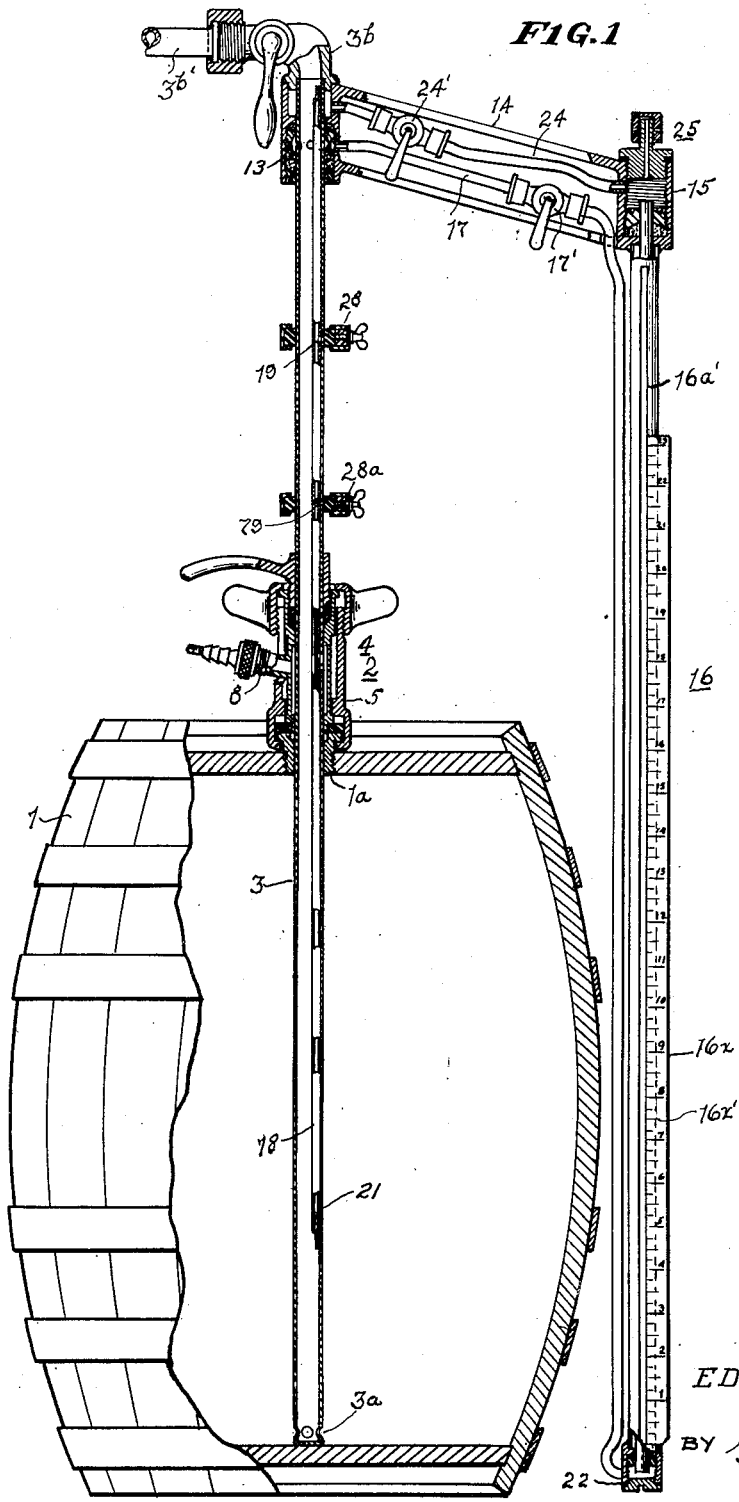
INVENTOR.
EDWARD HANSON.
BY Geo. B. Pitts
attorney

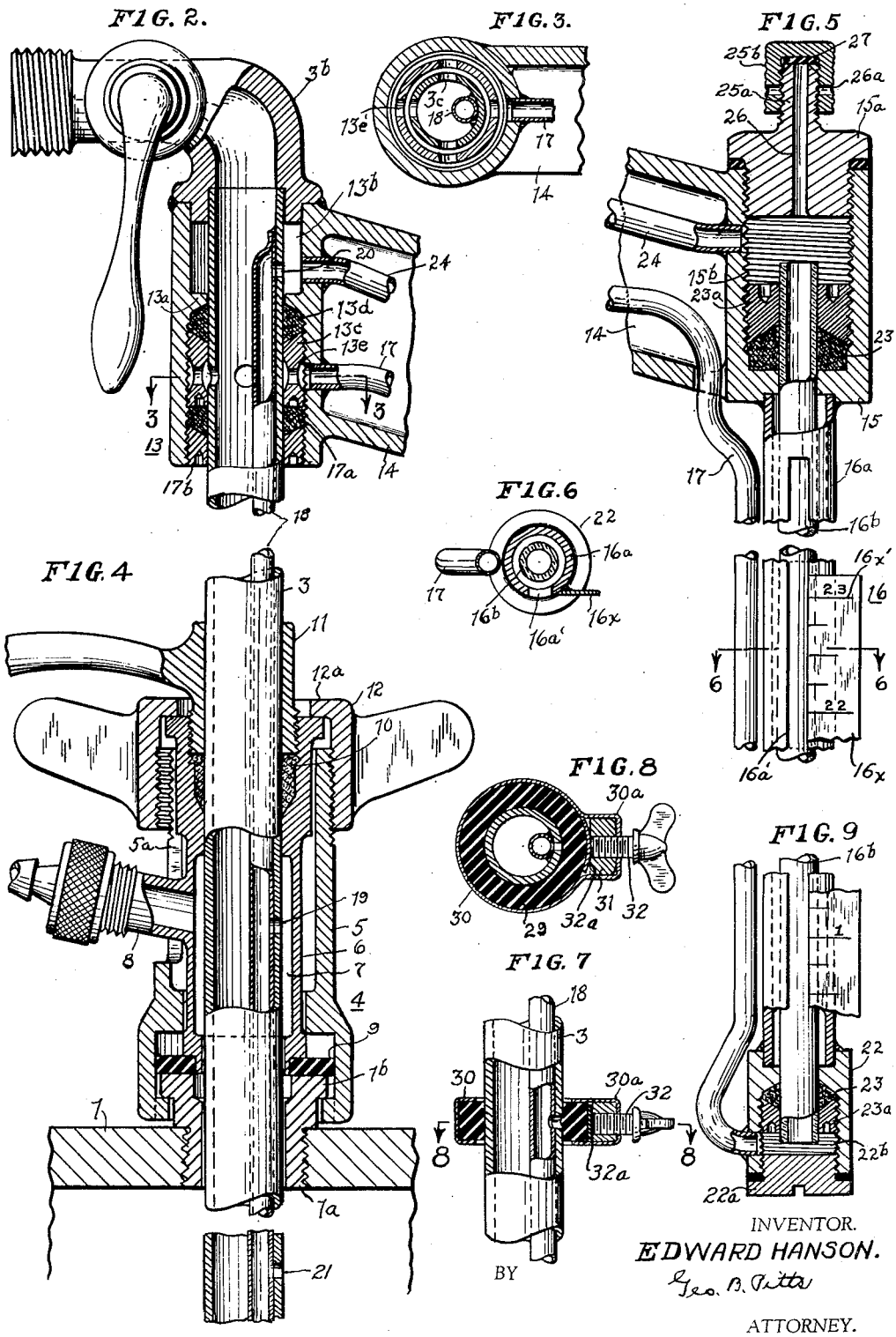

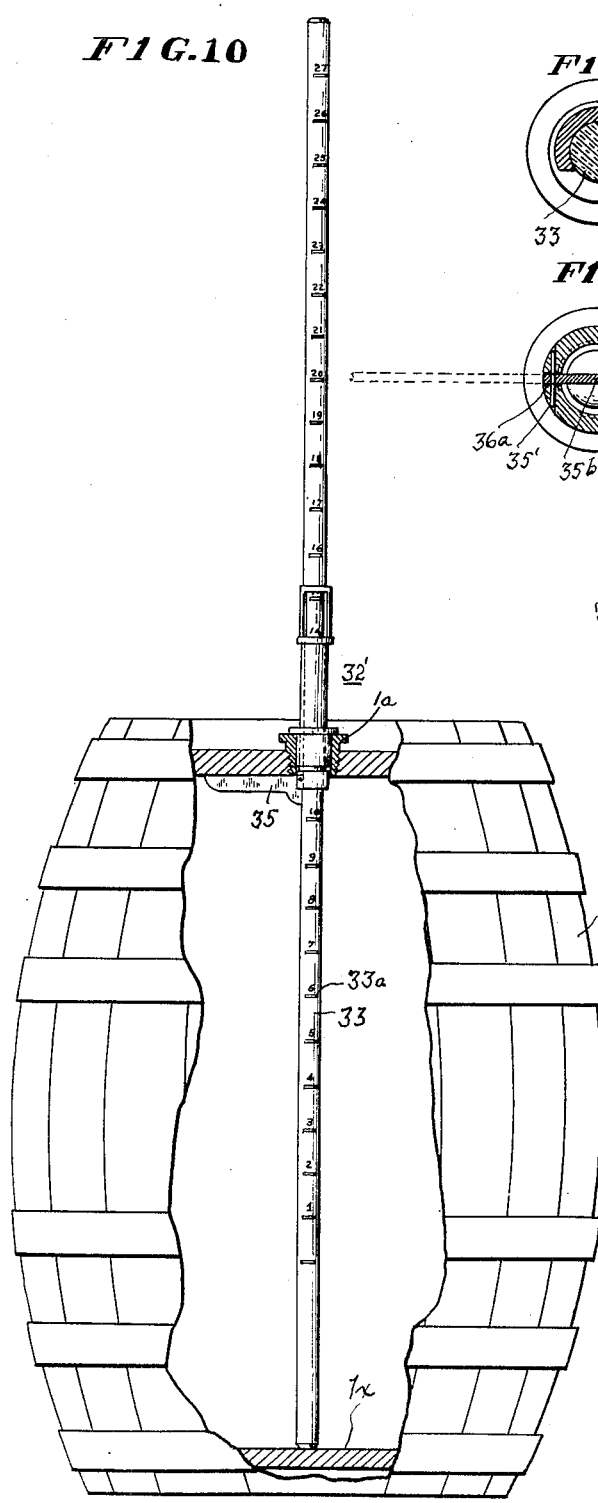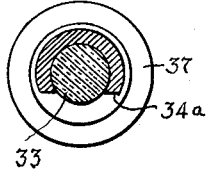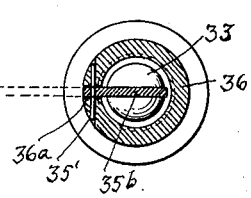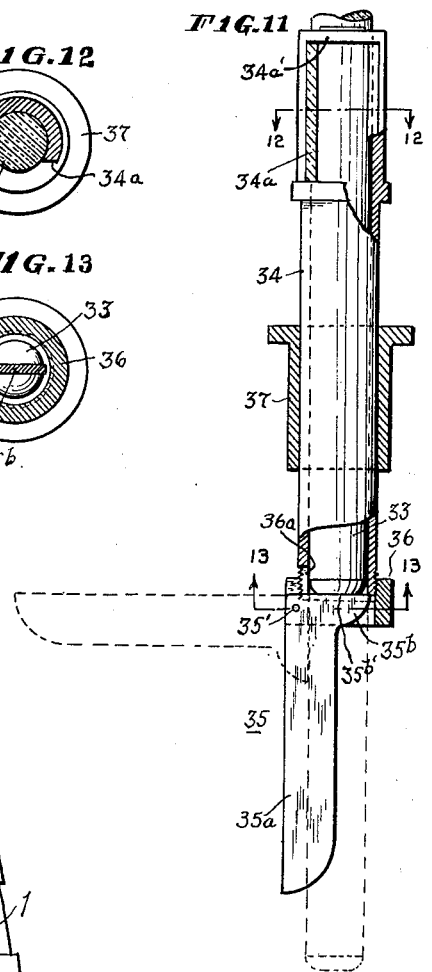

Patented Apr. 3, 1951

2,547,002

UNITED STATES PATENT OFFICE 2,547,002

APPARATUS FOR DETERMINING THE LIQUID LEVEL IN A CONTAINER

Edward Hanson, Cleveland, Ohio, assignor of one-tenth to George B. Pitts, Cleveland Heights, Ohio Application April 16, 1945, Serial No. 588,454

6 Claims. (Cl. 225—1)

This invention relates to a liquid dispensing mechanism and to the methods of determining the liquid level in a container and the capacity thereof. The invention is particularly useful in connection with containers for carbonated beverages, including beer and ale. In the sale of such beverages the dispenser has no way of determining whether a container as delivered to him is completely full and experience has shown that many containers when delivered to the dispenser are only partially filled, so that the latter pays for a quantity of the beverage based on the full capacity of the container when it is less than completely full and suffers a loss in dispensing the beverage from the container.

One object of the invention is to provide an improved dispensing equipment capable of dispensing liquid from a container and recharging the liquid with gas when necessary.

Another object of the invention is to provide an improved equipment having a gage for determining the level of a carbonated liquid in a container and having provision for eliminating any foam in the gage when the level of liquid is to be determined.

Another object of the invention is to provide an improved method for determining the quantity of liquid in a container.

Another object of the invention is to provide an improved method of determining the level of the liquid in a container when first filled and/or after portions of the liquid have been removed or dispensed therefrom.

Another object of the invention is to provide an improved equipment for measuring the distance between the inner opposed walls of a container.

A further object of the invention is to provide an improved equipment of this character of simple construction and capable of being readily assembled in relation to a container.

Other objects of the invention will be apparent to those skilled in the art to which my invention relates from the following description taken in connection with the accompanying drawings, wherein Fig. 1 is a view, partly in elevation and partly in section, of a container and a combined dispensing and level determining equipment embodying my invention.

Fig. 2 is a fragmentary section of parts shown in Fig. 1, enlarged.

Fig. 3 is a section on the line 3—3 of Fig. 2.

Figs. 4 and 5 are fragmentary views of parts shown in Fig. 1, enlarged.

Fig. 6 is a section on the line 6—6 of Fig. 5.

Fig. 7 is a fragmentary view of parts shown in Fig. 1, enlarged.

Fig. 8 is a section on the line 8—8 of Fig. 7.

Fig. 9 is a fragmentary view of parts shown in Fig. 1, enlarged.

Fig. 10 is a view, partly in section and partly in elevation, showing the equipment assembled in a container and arranged to measure the interior distance between the top and bottom walls of the container.

Fig. 11 is a view, partly in section, of the equipment shown in Fig. 10.

Figs. 12 and 13 are sections on the lines 12—12 and 13—13, respectively, of Fig. 11.

In the drawings, 1 indicates a suitable container shown as consisting of a typical bilge barrel; but my equipment is readily applicable to other types of containers, as will be apparent. Containers for beer and ale, in most instances, are provided in one wall with a bung 1a having on its outer end bayonet-joint elements 1b and the opening through the bung, after the barrel 1 is filled, is closed by a cork (not shown).

2 indicates as an entirety a mechanism for dispensing or discharging liquid from the container 1, for re-charging the liquid with gas when necessary and for determining at any time the level of the liquid therein, this mechanism consisting of the following: 3 indicates a discharge pipe for the liquid adapted to be inserted through the opening in the bung 1a and engaged with the bottom of the barrel as shown in Fig. 1, this operation serving to push the cork into the barrel. The inner end of the pipe 3 is formed with one or more inlet openings 3a. The outer end of the pipe 3 is connected to a valved outlet member 3b, which is connected to a pipe 3b' terminating in a faucet (not shown), a portion of which pipe may consist of a coil adapted to be submerged in a cooling medium. 4 indicates as an entirety a fixture through which the tube 3 extends, sealingly mounted on the bung 1a and arranged to sealingly engage the tube 3 whereby the tube is held in position in the container 1 and may be utilized to support other parts of the mechanism, as later set forth. The fixture 4 consists of an outer hollow member 5 and an inner hollow member 6 the inner wall of which is enlarged to form with the tube 3 a chamber 7. At one side the chamber 7 is connected to a nipple 8 having a check valve therein (not shown). The nipple 8 extends laterally through an opening 5a formed in the side wall of the outer member 5. The nipple 8 is adapted to be connected with a pipe (not shown) leading from a source of gaseous medium (air or carbonic gas) under pressure. The inner wall of the inner member 6 at its lower end loosely fits the tube 3 and the tube 3 loosely fits the bung 1a, so that the medium supplied to the chamber 7 may flow into the container 1 and apply pressure to the liquid therein and force it out through the pipe 3 as later set forth. The outer wall of the inner member 6 at its lower end engages a suitable gasket 9 which is positioned on the outer end of the bung 1a. The upper end of the inner member 6 is shaped to accommodate a suitable gland 10, which is compressed by a collar 11 having screw threaded engagement with the inner wall of the inner member 6. The lower end of the outer member 5 is provided with bayonet-joint elements arranged to engage the elements on the bung 1a, whereby the member 5 is rigidly connected thereto. The upper end of the member 5 is externally threaded to receive a nut 12, the nut 12 having on its outer end an inwardly extending flange 12a which engages the upper end of the inner member 6, so that when the nut 12 is tightened the members 5, 6, are rigidly connected in assembled relation and the inner member 6 is forced into sealing engagement with the gasket 9. 13 indicates a fitting into which the upper end of the discharge pipe 3 extends. By preference the pipe 3 extends through the fitting 13 and its upper end is seated in the wall of the outlet member 3b, which is preferably welded to the outer end of the fitting 13. The fitting 13 is connected (preferably integrally) to an arm 14, the outer end of which is connected (preferably integrally) to a fitting 15, the latter in turn supporting a gage indicated as an entirety at 16. The fitting 13 is provided interally intermediate its ends with an annular wall 13a which co-operates with the pipe 3 and outlet member 3b to form a chamber 13b for a purpose later set forth. Below the wall 13a, the fitting 13 is internally threaded to take a nut 13c which is tightened against a packing 13d so as to seal the chamber 13b. The outer and inner sides of the nut 13c are circumferentially grooved to provide recesses 13e connected by ports 13e', the inner recess 13e being connected with the pipe 3 by outlet openings 3c and the outer recess being connected with a pipe 17, which extends through the wall of the fitting 13, for a purpose later set forth. The recesses 13e and pipe 3 are sealed by a gland 17a which is compressed by a nut 17b engaging the screw threads on the inner wall of the fitting 13. 18 indicates a tube within and fixed to the inner wall of the pipe 3, the tube being of small size so as not to unduly affect the capacity of the pipe 3 and closed at its upper and lower ends. The tube 18 is connected with the chamber 7 by alined ports 19 formed in its wall and the wall of the pipe 3 to receive the medium supplied under pressure to the chamber 7 and connected with the chamber 13b by alined ports 20 formed in its wall and the wall of the tube 3 to supply the gaseous medium to the chamber 13b. By preference the tube 18 extends downwardly below the chamber 7 to a point remote from the lower end of the pipe 3, that portion of the tube 18 which is within the container 1 being connected with the latter by spaced alined ports 21 (which are preferably larger in size than that of the ports 19) formed in its wall and the wall of the pipe 3.

The gage 16 consists of a tubular member 16a formed of rigid material, such as metal, and a tube 16b within and extending through the tubular member 16a, the tube 16b being formed of transparent material for a purpose later apparent. The tube 16a is formed with an elongated slot 16a' to expose the tube 16b and provided along one edge of the slot 16a' (preferably on a plate 16x) with designated graduations 16x', whereby the liquid level in the container 1 may be determined in inches or other scale. The upper end of the tubular member 16a is welded to the lower end of the fitting 15, whereas its lower end is welded to the upper end of a fitting 22, this arrangement serving to rigidly connect the fittings together. The opposite ends of the tube 16b extend into the fittings 15, 22, and are sealed with respect to the inner walls thereof by glands 23, 23, which are compressed by externally threaded nuts 23a, 23a, engaging the threads on the inner walls of these fittings, the glands serving to maintain the tube 16b in position. The upper end of the fitting 15 is closed by a screw threaded plug 15a and forms with the adjacent nut 23a a chamber 15b, which is connected by a pipe 24 with the chamber 13b. The lower end of the fitting 22 is closed by a screw threaded plug 22a and forms with the adjacent nut 23a a chamber 22b, to which the outer end of the pipe 17 is connected. The pipes 17 and 24 are provided with suitable cut offs 17', 24', respectively, which are closed when the pipe 3 is introduced into the container 1. In dispensing the liquid from the container 1, the pressure is maintained on the liquid therein, due to the supply of the gaseous medium to the chamber 7, which supply is uniformly regulated in a well known manner to force the liquid through the pipe 3, and the valve in the member 3b is opened, so that when the dispensing faucet is opened to fill a stein, mug or other receptacle the latter is filled. The supply of the gaseous medium not only serves to effect discharge of the liquid from the container 1, but when such medium is carbonic gas, it replaces any gas which has escaped from the liquid incident to dispensing thereof.

25 indicates a relief valve provided for the tube 16b and chamber 15b, whereby any foam produced when the liquid is displaced into the tube 16b may be discharged therefrom and the chamber 15b. The valve 25 consists of an externally threaded boss 25a provided on the outer end of the plug 15a and an internally threaded cap 25b removably mounted on the boss 25a. As shown, the plug 15a and boss 25a are formed with a through opening 26 and the side wall of the cap 25b is formed with a plurality of escape ports 26a, so that when the cap 25b is backed up, the foam may be discharged through the ports 26a, as later set forth. This discharge operation is effected by closing the valve 24', while maintaining the valve 17' open to force the liquid in the tube upwardly and filling it and the chamber 15b and forcing the foam out through the escape ports 26a. By closing the relief valve cap 25b and opening the valve 24' the pressure in the container 1 and tube 16b will be equalized and thus restore the level of the liquid therein. The cap 25b is tightened against a gasket 27 to seal the opening 26.

When the level of the liquid in the container 1 is to be determined, the valve in the pipe 3b being closed and the cut-off 24' also closed with the cut-off 17' open, the liquid in the container 1 is forced through the pipe 3, recesses 13e, pipe 17 and into the lower end of the tube 16b. As the first part of the carbonated liquid is forced through these passages it is formed into slugs of foam due to the release of pressure in the passages. To eliminate this foam the relief cap 25b is backed up to permit escape of the foam and air originally present in the tubes 17 and 16b. This bleeding operation takes only an instant and as soon as clear liquid fills the reading tube 16b the relief cap 25b is closed, and the cut-off 24' is now opened to admit the gas or air under the pressure existing on top of the liquid in the container 1, thus equalizing the pressure on top of the liquid in tube 16b with the pressure on the liquid in the container 1. The height of the column of liquid in the transparent tube 16b will now show the exact height of the liquid in the container 1. The pressure through the pipe 3 and the remainder of the dispensing system naturally drops during the opening of the faucet while filling a glass and the pressure in the gauge 16b tube will also fall to a certain extent, varying according to the friction in the tube and passage occupied by the liquid between the pipe 3b and the tube 16b.

The closing of the dispensing faucet restores the balance between the liquid in the container 1 and the gauge tube 16b thus providing a reliable means of determining the exact level of the liquid in the container 1. The tube 17 and the bore of the tube 16b are relatively small so that the displaced liquid will not materially affect the resulting level of the liquid in the container 1. The ports 21 permit the gaseous medium to flow from the container 1 into the tube 18 to insure an equalized pressure in the system when the level of the liquid is to be determined. The ports 21 are preferably larger in size than that of the ports 19 so that a larger quantity of the gas in the container may flow through the tube 18 than that supplied to the latter from the chamber 7. This gas supply takes place when a portion of the liquid in the container has been dispensed and is particularly advantageous when the pressure medium is air, so that the gas (which is heavier than air and rests on the liquid in the container) or gas and air, with a larger proportion of the gas as compared to that of the air, flows through the tube 18.

The pipe 3 is of a length to permit it to be applied to containers of different sizes. For this purpose, the pipe 3 and tube 18 are formed with a plurality of alined ports 19, in spaced relation therealong, the lower ports 19 providing for the assembly of the fixture 4 for a small size container 1, as shown. In this illustrated assembly, the upper alined ports 19 are closed by devices indicated as an entirety at 28, 28a, respectively, as shown in Fig. 1. Each device 28, 28a, consists of a flexible collar 29 (preferably formed of rubber) slidably fitting the pipe 3 and mounted in an annular flanged casing 30. One side of the casing 30 is expanded, as shown at 30a, to house a nut 31, to receive a screw 32, preferably of the wing type. The inner end of the screw 31 engages a pressure plate 32a to press the collar against the pipe 3 and close the adjacent ports 21, as shown in Figs. 7 and 8. When the mechanism is to be applied to the next size container 1, the device 28 is loosened and slid upwardly and clamped to the pipe 3 by operation of the screw 32 and the device 28a is moved up and replaces the device 28 to close the uppermost ports 19. Then, upon releasing the gland 10, the pipe 3 may be slid endwise through the fixture 4 to relate the intermediate ports 19 with the chamber 7. When a still larger container 1 is employed the device 28a is loosened and slid upwardly and clamped to the pipe 3 and the pipe 3 is adjusted to relate the uppermost ports 19 to the chamber 7.

While I have shown the combined dispensing and level determining mechanism mounted in one head of the container it may be mounted on the container in which the bung 1a is positioned in the side wall thereof.

32' indicates as an entirety a device for measuring the distance between the wall of the container in which the bung is mounted and the opposed wall thereof. As the mechanism shown in Fig. 1 is mounted in the head of the container 1, the distance between the heads of which is to be measured the device 32' is also shown projecting through the head of the container 1. The device 32' consists of the following:

33 indicates a rod formed of suitable material (such as glass, which is inert to most acids and other substances) and provided along one side with designated graduations 33a. 34 indicates a sleeve slidably fitting the rod 33. The upper end of the sleeve 34 may serve as an index element or market, when the sleeve is in operating position, but is preferably provided with a window 34a. In this arrangement the upper end wall of the window may serve as the index element 34a' to be related to the graduations 33a and the window enables the user to see the graduations below as well as above the index element 34a'. At its lower end, the sleeve 34 is provided with a member 35, which is pivoted on a pin 35' supported by the sleeve to swing on an axis disposed at right angles to the axis of the rod 33. The member 35 consists of a long arm 35a and an inwardly extending short arm 35b. As the long arm 35a serves as a weight, it serves to normally maintain the arm 35b in the path of movement of the rod 33, so that when the rod is projected endwise through the sleeve 34, the member 35 is swung about the pin 35' as shown in dotted lines in Fig. 11. It will be observed that the pin 35' is related to the upper end wall 35b' of the short arm 35b and side of the rod 33, so that when the rod 33 is projected through the sleeve 34 and engaged with the lower head 1x of the container 1, the rod 33 may ride the wall 35b' and maintain the arm 35a raised, preferably at right angles to the rod. The mounting for the pin 35' preferably consists of an internally screw threaded collar 36, engaging external threads on the lower end portion of the sleeve 34 and formed at one side with a radially disposed slot 36a, spanned by the pin 35' and in which the member 35 swings. 37 indicates an annular device slidably fitting the sleeve 34 and arranged to be seated in the bung 1a and serve as a guide and support for the sleeve 34, when a measurement is to be made and the sleeve in turn may serve as a guide and support for the rod 33. The annular device 37 being slidable on the sleeve 34 between an annular shoulder provided thereon below the window 34a and the collar 36, permits the sleeve 34 to be positioned with respect to a container wall wherein the distance between the inner surface thereof and the outer end of the bung 1a, with which the flange on the annular device engages, varies.

In assembling the measuring device 32' in the container 1, the bushing 37 is first seated in the bung 1a with the member 35 projected in the container while holding the rod 33 upwardly with its lower end above the lower end of the sleeve 34. The rod 33 and sleeve 34 are then projected inwardly, the sleeve 34 being moved by one hand of the user and the rod 33 being moved by his other hand, these movements being continued until the upper end of the arm 35a clears the inner end of the bung 1a; at this position (which corresponds to the inner surface of the container), the sleeve 34 is held stationary while movement of the rod 33 is continued until it engages the remote wall of the container, the initial movement of the rod following the end of movement of the sleeve 34, serving to swing the member 35 into engagement with the inner surface of the container 1, as shown in Fig. 10. The graduations 33a on the rod 33 are so arranged that when the parts are in the position shown in Fig. 10, the graduation related to the index element 34a' will indicate the distance in inches (or other scale corresponding to that of the scale 16x') between the bottom and top heads of the container 1.

It will be observed that the gage 16 has a fixed relation to the discharge pipe 3 and that the zero end of the graduations 16x' on the gage 16 is alined with the lower end of the pipe 3 so that the level of the liquid in the container 1 can be determined.

In carrying out my process I proceed as follows: first the mechanism 2 is assembled as shown in Fig. 1 and the level of the liquid in the container 1 determined in the manner already set forth and noted, for example, at graduation 14 on the scale 16x'. Next, the distance between the inner surfaces of the container heads is measured. In this step, which is carried out following the complete dispensing of the liquid therein, the mechanism 2 is removed from the container 1 and the measuring device 32' substituted therefor and then the interior dimension is made and compared with the level previously indicated at graduation 14. Next, the container 1 is completely filled with a suitable liquid, such as water, the mechanism 2 re-assembled as shown in Fig. 1, and the pressure medium applied to the liquid to force from the container into a receptacle (not shown) that volume of the water necessary to lower the level thereof in the container to that previously determined at level 14. The water in the receptacle can then be measured in a standard measuring vessel and thus determine the volume of liquid less than the capacity of the container 1 as originally delivered.

It will be noted that the mechanism and measuring device and process set forth enables the user to determine the shortage in a container irrespective of the volumetric capacity thereof; also by filling the container and then discharging it into a measuring vessel he can determine not only the volumetric quantity but the shortage in relation thereto.

It often happens that the carbonated liquid dispensed from the container 1, due to escape of the carbonic gas or otherwise, has what is known as a "flat" taste and obviously this condition is not conducive to maintaining the dispenser's good will. The mechanism 2 provides for the recharging of the liquid before it is dispensed to the customer. This re-charging operation is accomplished by maintaining the cut-offs or valves 17', 24', open, so that the gas may flow through the pipe 18, pipe 24, tube 16b, and mix with the liquid in the latter; the gas and liquid is then forced through the pipe 17, and recesses 13e into the pipe 3 for mixture with the liquid being supplied to the dispensing faucet; this operation being possible since the pressure on the liquid in the discharge pipe 3, during the period when the dispensing faucet is open, is reduced. The cut-off 17' may be adjusted to regulate the supply of gas to the liquid in the pipe 3 during each operation of the dispensing faucet.

It will be observed that the valve in the outlet member 3b may be omitted or left open during the operation of determining the liquid level, provided the dispensing faucet is closed during this operation.

To those skilled in the art to which my invention relates many changes in construction and widely different embodiments and applications of the invention will be apparent without departing from the spirit and scope of the invention. My disclosures and the description herein are purely illustrative and are not intended to be in any sense limiting.

What I claim is:

1. In a combined dispensing and liquid gage mechanism, the combination of a fixture, a discharge pipe extending through said fixture and adapted to extend into a container, a valved outlet member on the outer end of said pipe, means for supplying a gaseous medium under pressure through said fixture into the container for applying pressure to the liquid therein, whereby the liquid may be discharged through said pipe, a tube within and extending longitudinally of said pipe and connected to said gaseous medium supply within said fixture, a fitting fixed to said pipe above said fixture and forming with the pipe a chamber, alined ports formed in said tube and said pipe, whereby the gas flows from said tube into said chamber, a liquid gage, valve controlled connections for the liquid between said pipe and the lower end of said gage, and valve controlled connections for the gas between said chamber and the upper end of said gage.

2. A mechanism as claimed in claim 1, wherein means are provided for discharging foam from the upper end of said liquid gage.

3. In a combined dispensing and liquid gage mechanism, the combination of a fixture, a discharge pipe extending through said fixture and adapted to extend into a container, a valved outlet member on the outer end of said pipe, means for supplying a gaseous medium under pressure through said fixture into the container for applying pressure to the liquid therein, whereby the liquid may be discharged through said pipe, a tube within and extending longitudinally of said pipe and connected to said gaseous medium supply within said fixture, a fitting fixed to said pipe above said fixture and forming with the pipe a chamber, alined ports formed in said tube and said pipe, whereby the gas flows from said tube into said chamber, a liquid gage, valve controlled connections for the liquid between said pipe and the lower end of said gage, a hollow fitting into which the upper end of said gage extends, a closure for said hollow fitting, and a valve controlled connection between said chamber and said hollow fitting.

4. A mechanism as claimed in claim 3 wherein said closure is provided with a valve controlled opening to permit discharge of foam in said gage and hollow fitting.

5. In a combined dispensing and liquid gage mechanism, the combination of a fixture, a discharge pipe endwise adjustably extending through said fixture and adapted to extend into a container, an outlet member on the outer end of said pipe, means for supplying a gaseous medium under pressure through said fixture into the container for applying pressure to the liquid therein, whereby the liquid may be discharged through said pipe, a tube within and extending longitudinally of said pipe, said tube and said pipe being formed with lower alined ports through which the gas is supplied to said tube from said fixture when the pipe is adjusted for one size of container and with upper alined ports through which the gas is supplied from said fixture to said tube when the pipe is adjusted for a larger size of container, a fitting fixed to said pipe above said fixture and forming with the pipe a chamber, alined openings formed in said tube and said pipe, whereby the gas flows from said tube into said chamber, a liquid gage, valve controlled connections for the liquid between said pipe and the lower end of said gage, and valve controlled connections between said chamber and the upper end of said gage.

6. In a combined liquid dispensing and gage mechanism, the combination of a fixture, a discharge pipe extending through said fixture and adapted to extend into a container, a valve controlled outlet member on the outer end of said pipe, means for supplying a gaseous medium under pressure through said fixture into the container for applying pressure to the liquid therein, whereby the liquid may be discharged through said pipe, a tube within and extending longitudinally of said pipe and connected to said gaseous medium supply within said fixture, a fitting fixed to said pipe above said fixture and forming with the latter a chamber, an outlet connection for the gaseous medium from said tube through the wall of said pipe into said chamber, a liquid gage, valved controlled connections for the liquid between said pipe and the lower end of said gage, a hollow fitting into which the upper end of said gage extends, a valve controlled connection between said chamber and said hollow fitting, and a relief valve for the escape of foam mounted on said hollow fitting.

EDWARD HANSON.

REFERENCES CITED

The following references are of record in the file of this patent:

UNITED STATES PATENTS

| Number | Name | Date |
|---|---|---|
| 490,860 | Snoeck | Jan. 31, 1893 |
| 679,201 | Allison | July 23, 1901 |
| 750,449 | Gillard | Jan. 26, 1904 |
| 1,065,233 | Gittinger | June 17, 1913 |
| 1,248,340 | Kinney | Nov. 27, 1917 |
| 1,991,264 | Thomas et al. | Feb. 12, 1935 |
| 2,083,281 | Spayd | June 8, 1937 |

FOREIGN PATENTS

| Number | Country | Date |
|---|---|---|
| 370,962 | France | Jan. 8, 1907 |